(12) United States Patent
Mueller

(10) Patent No.: US 7,204,600 B2
(45) Date of Patent: Apr. 17, 2007

(54) OUTSIDE REAR VIEW MIRROR FOR VEHICLES, PARTICULARLY PASSENGER CARS

(75) Inventor: Marcus Mueller, Pforzheim (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 11/005,076

(22) Filed: Dec. 7, 2004

(65) Prior Publication Data

US 2005/0134985 A1    Jun. 23, 2005

(30) Foreign Application Priority Data

Dec. 19, 2003  (DE) ................ 103 59 750

(51) Int. Cl.
G02B 5/08  (2006.01)
(52) U.S. Cl. ...................................... 359/841
(58) Field of Classification Search ............... 359/879, 359/841
See application file for complete search history.

(56) References Cited

U.S. PATENT DOCUMENTS

| | | | |
|---|---|---|---|
| 4,740,066 A |   | 4/1988 | Whitehead |
| 4,840,475 A |   | 6/1989 | Herzog et al. |
| 4,877,319 A | * | 10/1989 | Mittelhauser ............... 359/841 |
| 4,919,525 A | * | 4/1990 | Gilbert ........................ 359/841 |
| 5,477,391 A | * | 12/1995 | Boddy ......................... 359/841 |
| 5,959,790 A | * | 9/1999 | Hempelmann ............... 359/841 |
| 6,092,778 A |   | 7/2000 | Lang et al. |
| 6,422,707 B2 |   | 7/2002 | Pirner et al. |
| 6,565,218 B2 | * | 5/2003 | Pirner et al. ................ 359/841 |
| 2002/0006002 A1 |   | 1/2002 | Pirner et al. |

FOREIGN PATENT DOCUMENTS

| | | |
|---|---|---|
| DE | 34 40 477 | 7/1988 |
| DE | 196 49 339 | 6/1998 |
| DE | 197 48 626 | 6/1999 |
| DE | 100 22 448 | 11/2001 |
| DE | 100 56 915 | 6/2002 |
| EP | 0 340 944 A2 | 11/1989 |

* cited by examiner

Primary Examiner—Mark A. Robinson
Assistant Examiner—Scott Stephens
(74) Attorney, Agent, or Firm—Crowell & Moring LLP

(57) ABSTRACT

An outside rear view mirror for vehicles, particularly passenger cars, includes at least one mirror base fastened to the vehicle, a mirror head which can be swivelled relative to the mirror base, an intermediate member whose one end is connected in a hinged manner by way of a first swivel axis with the mirror base, and whose other end is connected in a hinged manner by way of a second swivel axis with the mirror head. At least one spring element extends transversely with respect to the swivel axes and which, in the driving position of the outside rear view mirror, presses the mirror head against the mirror base. So that, in the driving position of the outside rear view mirror, the mirror head can be held in position at the mirror base by simple devices in a stiff and play-free manner, it is provided that a centering detent device effective in at least two planes is disposed between the mirror head and the mirror base. In a driving position of the outside rear view mirror, the mirror head is connected only by way of the detent device and the at least one spring element in a force-transmitting manner with the mirror base.

22 Claims, 9 Drawing Sheets

OUTSIDE REAR VIEW MIRROR FOR VEHICLES, PARTICULARLY PASSENGER CARS

BACKGROUND AND SUMMARY OF THE INVENTION

This application claims the priority of German Application No. 10359750.6-51, filed Dec. 19, 2003, the disclosure of which is expressly incorporated by reference herein.

The invention relates to an outside rear view mirror for vehicles, particularly passenger cars. Preferred embodiments of the invention relate to an outside rearview mirror for a passenger car, comprising a mirror base to be fastened to the car, a mirror head which can be swivelled relative to the mirror base, an intermediate member whose one end is connected in a hinged manner by way of a first swivel axis with the mirror base, and whose other end is connected in a hinged manner by way of a second swivel axis with the mirror head, and at least one spring element which extends transversely with respect to the swivel axes and which, in the driving position of the outside rear view mirror, presses the mirror head against the mirror base.

Laws (for the protection of pedestrians) require that an outside rear view mirror can be swivelled away toward the front and the rear. Despite the swivel-away mechanism, the mirror head has to be connected such with the mirror base in a driving position of the outside rear view mirror that mirror glass vibrations are avoided.

In the case of a known vehicle (Mercedes E-Class), the mirror head is connected with the mirror base by means of an intermediate member and can be swivelled away by way of two swivelling axes. At least one spring element situated transversely with respect to the swivelling axes ensures that the mirror head is tensioned in the direction of the mirror base in a driving direction of the outside rear view mirror.

In this arrangement, the mirror head is connected by way of the intermediate joint in a force-transmitting manner with the mirror base. In order to ensure a hinged connection between the intermediate member and the mirror base, on the one hand, and the intermediate member and the mirror head, on the other hand, both hinged connections must have a certain play in the hinges. This play at the force-transmitting components has the result that air-stream-caused vibrations occur at the mirror head in the driving operation, which vibrations are transmitted to the mirror glass and impair the quality of the mirror image.

It is an object of the invention to take such measures on a biaxial outside rear view mirror, that, in the driving position of the outside rear view mirror, an extremely stiff play-free linkage of the mirror head to the mirror base is achieved, in which case, the swivellability of the mirror head in both directions must, however, be maintained in the event of a collision.

According to the invention, this object is achieved by providing an outside rearview mirror for a passenger car, comprising a mirror base to be fastened to the car, a mirror head which can be swivelled relative to the mirror base, an intermediate member whose one end is connected in a hinged manner by way of a first swivel axis with the mirror base, and whose other end is connected in a hinged manner by way of a second swivel axis with the mirror head, and at least one spring element which extends transversely with respect to the swivel axes and which, in the driving position of the outside rear view mirror, presses the mirror head against the mirror base, wherein centering detent device effective in at least two planes is provided between the mirror head and the mirror base, and wherein, in a driving position of the outside rear view mirror, the mirror head is connected only by way of the detent device and the at least one spring element in a force-transmitting manner with the mirror base.

Further advantageous features of preferred embodiments of the invention are described herein and in the claims.

Important advantages achieved by means of certain preferred embodiments of the invention are that, as a result of the centering detent device, which is provided between the mirror head and the mirror base and is effective in at least two planes, an extremely stiff, play-free linking of the mirror head to the mirror base is created because, in the driving position of the outside rear view mirror, the mirror head is connected in a force-transmitting fashion with the mirror base only by means of the detent device and the at least one spring element. In the arrangement according to the invention, the intermediate member is required only for the swivelling-away of the outside rear view mirror and not for the force transmission in the driving position.

According to certain preferred embodiments of the invention, the detent device formed of several mutually spatially coordinated detent elements and corresponding detent receiving devices has a simple construction, results in no additional cost and requires hardly any additional space because the components of the detent device extend adjacent to and in the area of the intermediate member. By means of the arrangement of preferably six detent elements and six pertaining detent receiving devices on the mirror head and on the mirror base respectively, according to certain preferred embodiments of the invention, a statically clearly defined connection is created between both spatial components. As a result of the spatially mutually adapted slanting contact surfaces on the detent elements and the detent receiving devices, according to certain preferred embodiments of the invention, a play-free and rattle-free connection is ensured between the two components, and manufacturing and installation tolerances can be compensated in a simple manner.

Because of the oppositely oriented construction of two mutually interacting contact surfaces of the detent elements and of the detent receiving devices respectively, according to certain preferred embodiments of the invention, an automatic mutual spatial positioning or centering of the two components respectively takes place, irrespective of their tolerance position. A short tolerance chain is obtained as a result of the direct connection of the mirror head and the mirror base. As a result, the tolerance-compensating components can have small dimensions (for example, the collar section of the sealing body). Since the detent device requires no additional space with respect to the intermediate member particularly in the transverse direction of the vehicle, it is also very suitable for so-called sprocket-type mirrors. Because of the stiff connection between the mirror head and the mirror base, the connection surface can be reduced, whereby design possibilities are increased in this area.

An embodiment of the invention is explained in detail in the figures.

Other objects, advantages, and novel features of the present invention will become apparent from the following detailed description of the invention when considered in conjunction with the accompanying drawings.

DETAILED DESCRIPTION OF THE DRAWINGS

Figure 1:
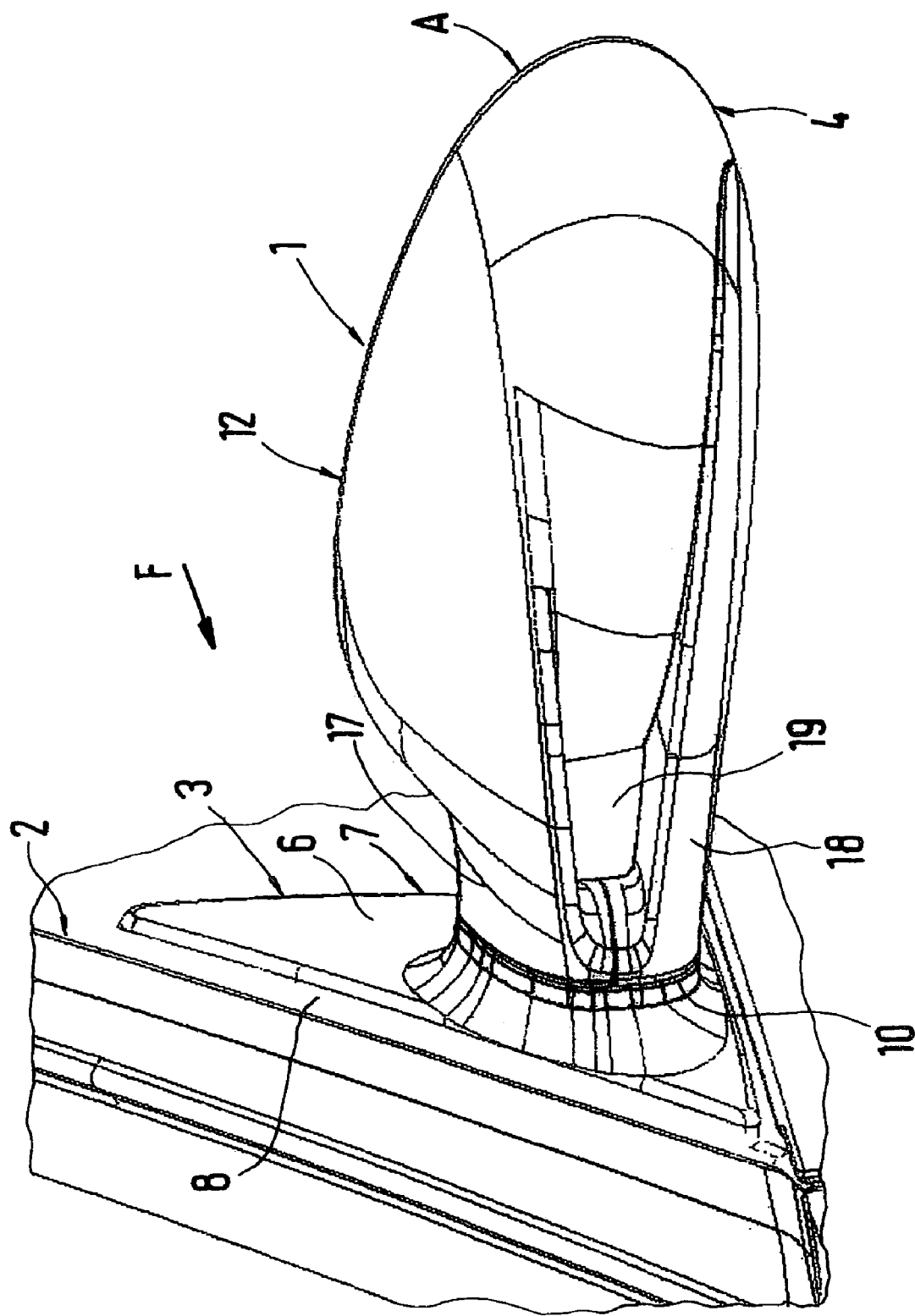
FIG. 1 is a perspective view diagonally from the front onto a partial area of a passenger car with an outside rear view mirror, constructed according to a preferred embodiment of the invention.

An outside rear view mirror 1 for a motor vehicle, particularly a passenger car, is composed of a mirror base 3 and a mirror head 4. In the embodiment shown, the mirror base 3 includes a supporting part 5 fastened in use to the vehicle body and a mirror base cover 6 placed on the supporting part 5 from the exterior side of the vehicle. The approximately triangular supporting part 5 is formed, for example, by a diecast part which is fastened by means of screws to a forward mirror triangle 7 of a vehicle side door 8. The triangle-shaped mirror base cover 6 is formed by a plastic part. However, the supporting part 5 and the mirror base cover 6 may also be constructed in one piece.

Figure 10:
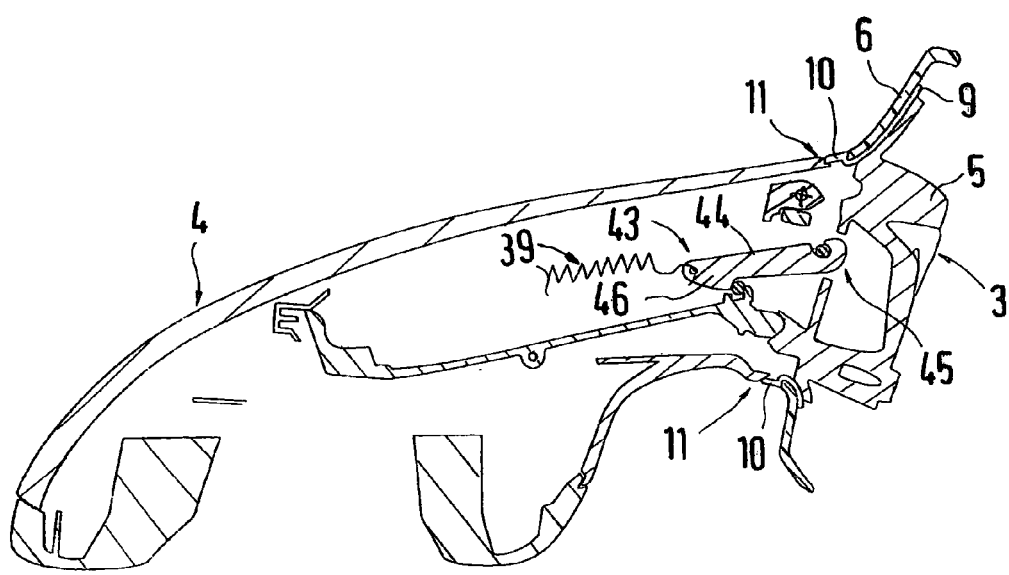
FIG. 10 is a horizontal sectional view of the outside rear view mirror of FIG. 1.

Between the supporting part 5 and the mirror base cover 6, a surrounding frame-type sealing body 9 is provided which projects beyond the mirror base cover 6 by means of an end-side lip-type collar section 10, an adjacent edge area 11 of the mirror head 4 resting on the collar section 10 (FIG. 10). The mirror head 4 includes a mirror housing 12, a two-armed inner frame part 13, a carrier plate 14, a glass assembly 15 and an adjusting mechanism 16 for the glass assembly 15 (FIG. 2).

In the embodiment shown, the outside rear view mirror 1 is constructed as a so-called sprocket-type mirror; that is, the mirror housing 12 is connected by means of an upper supporting arm 17 and a lower supporting arm 18 to the adjoining mirror base 3, an aerodynamically shaped passage opening 19 being provided between the two supporting arms 17, 18 (FIG. 1).

Figure 2:
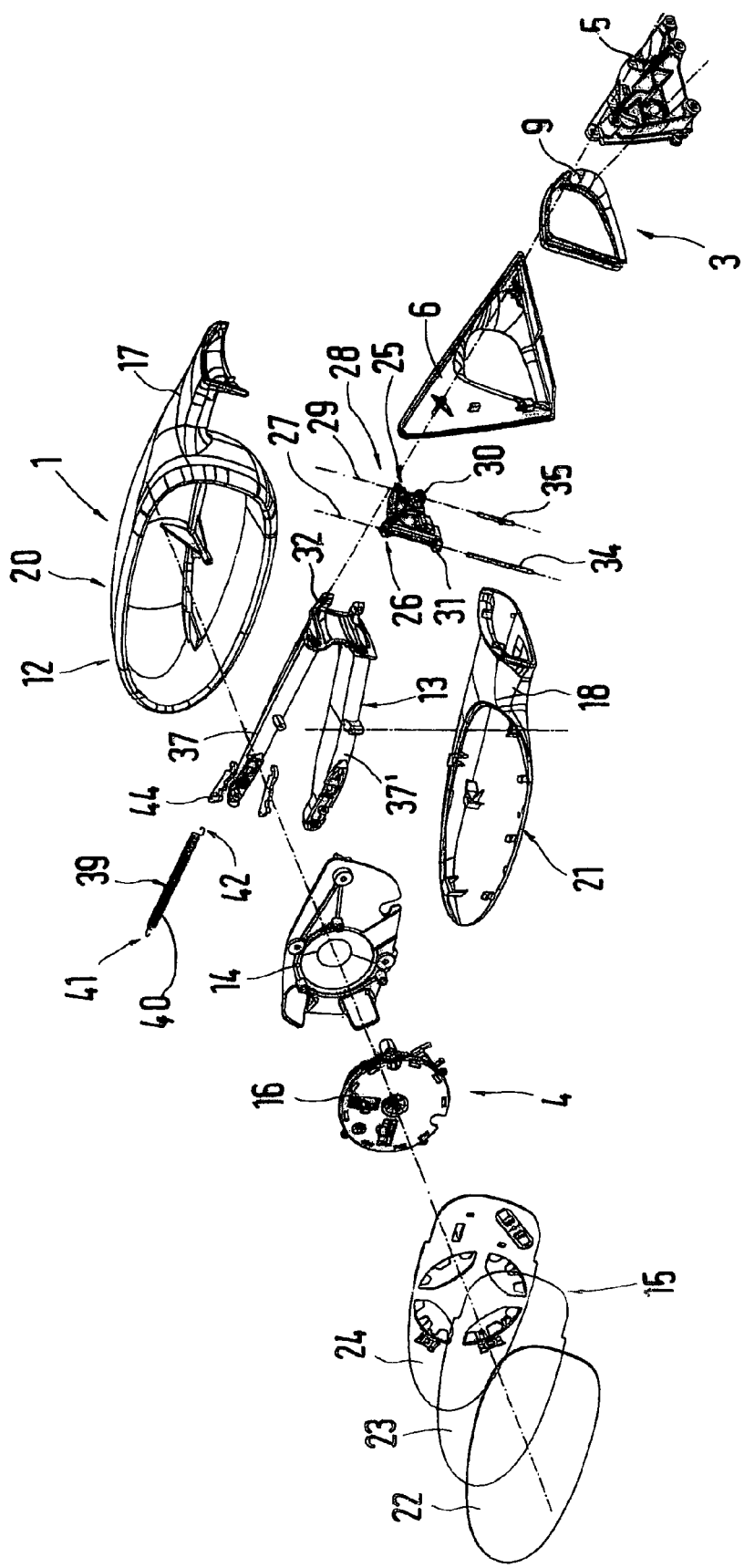
FIG. 2 is an exploded view of important components of the outside rear view mirror of FIG. 1.
Figure 3:
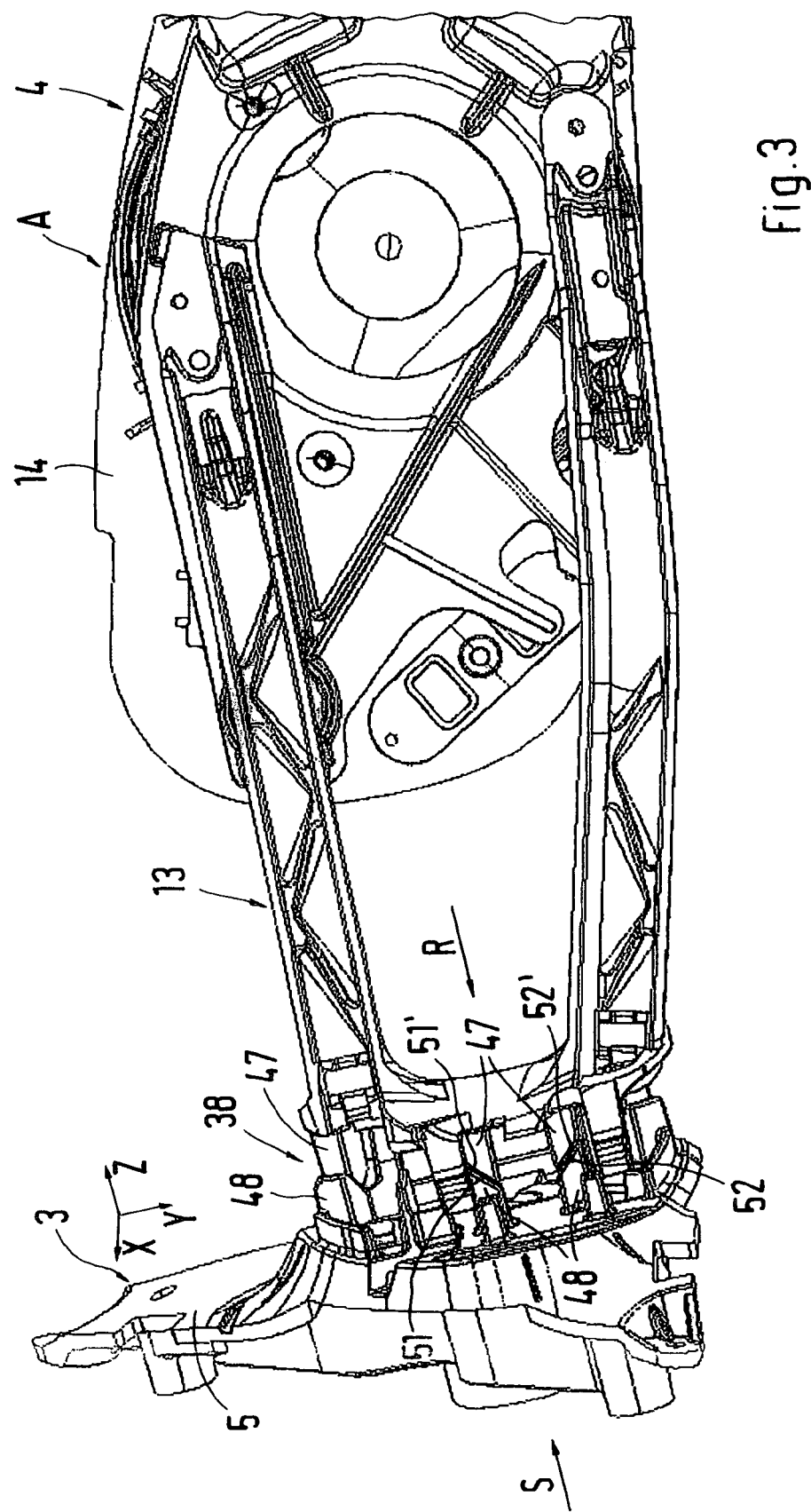
FIG. 3 is a perspective view diagonally from the front onto the mirror base, the mirror head and the intermediately connected detent device of the assembly of FIG. 1.
Figure 4:
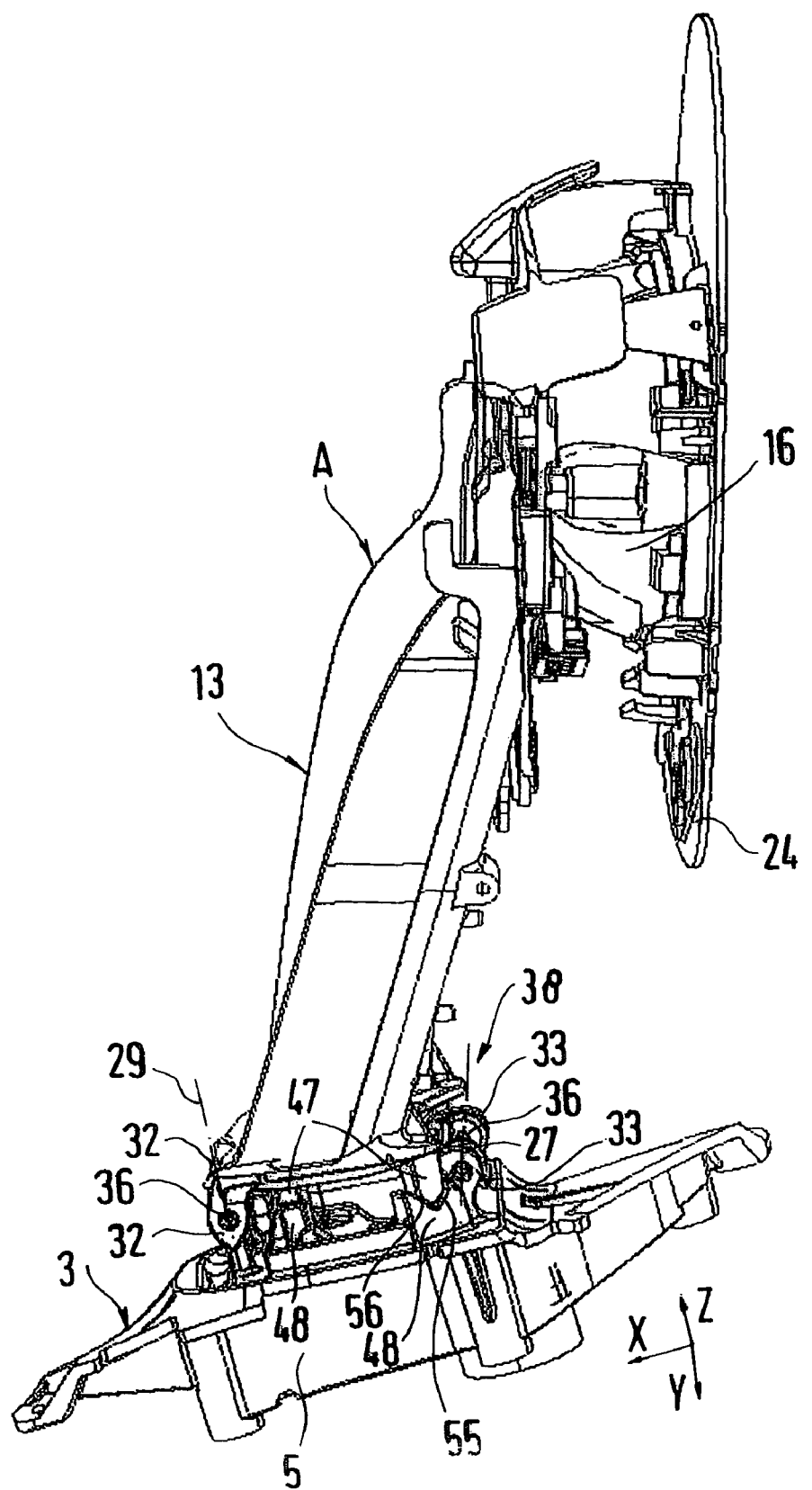
FIG. 4 is another perspective view of the mirror base, the mirror head and the intermediately connected detent device of the assembly of FIG. 1.

According to FIG. 2, the mirror housing is constructed in two parts, the upper supporting arm 17 being assigned to a top part 20 and the lower supporting arm 18 being assigned to a bottom part 21 (FIG. 2). The top part 20 and the bottom part 21 are locally screwed to one another. The approximately U-shaped two-armed frame part 13 is arranged inside the mirror housing 12, the carrier plate 14 being fastened on the two legs 37, 37' of the frame part 13. The carrier plate 14 accommodates the adjusting mechanism 16 on which the glass assembly 15 is, in turn, held in position. The glass assembly 15 comprises a mirror glass 22, a heating foil 23 and a glass carrier plate 24 made of a plastic material.

In a manner known per se, the mirror head 4 is connected in a hinged fashion with the mirror base 3 by means of a frame-type intermediate member 25 (FIG. 2). One end 26 of the intermediate member 25 is connected in a hinged manner with the mirror base 3 by way of a first upright swivel axis 27, and the other end 28 of the intermediate joint 25 is connected in a hinged manner with the mirror head 4 by way of a second upright swivel axis 29. As a result of the arrangement of two spaced upright swivelling axes 27, 29, the illustrated outside rear view mirror 1 should be assigned to the biaxial-mirror type. The two upright swivelling axes 27, 29 have the result that, in the event of an impact, that is, a contact with an object, the mirror head 4 can be swivelled away toward the front as well as toward the rear (not shown forward and rearward swivel position).

In the event of an impact from the front onto the mirror head 4, the latter swivels about the first, rearward swivel axis 27 toward the rear. In the event of an impact from the rear onto the mirror head 4, the latter swivels about the second, forward swivel axis 29 toward the front. The driving direction F of the passenger car is indicated in FIG. 1.

Figure 5:
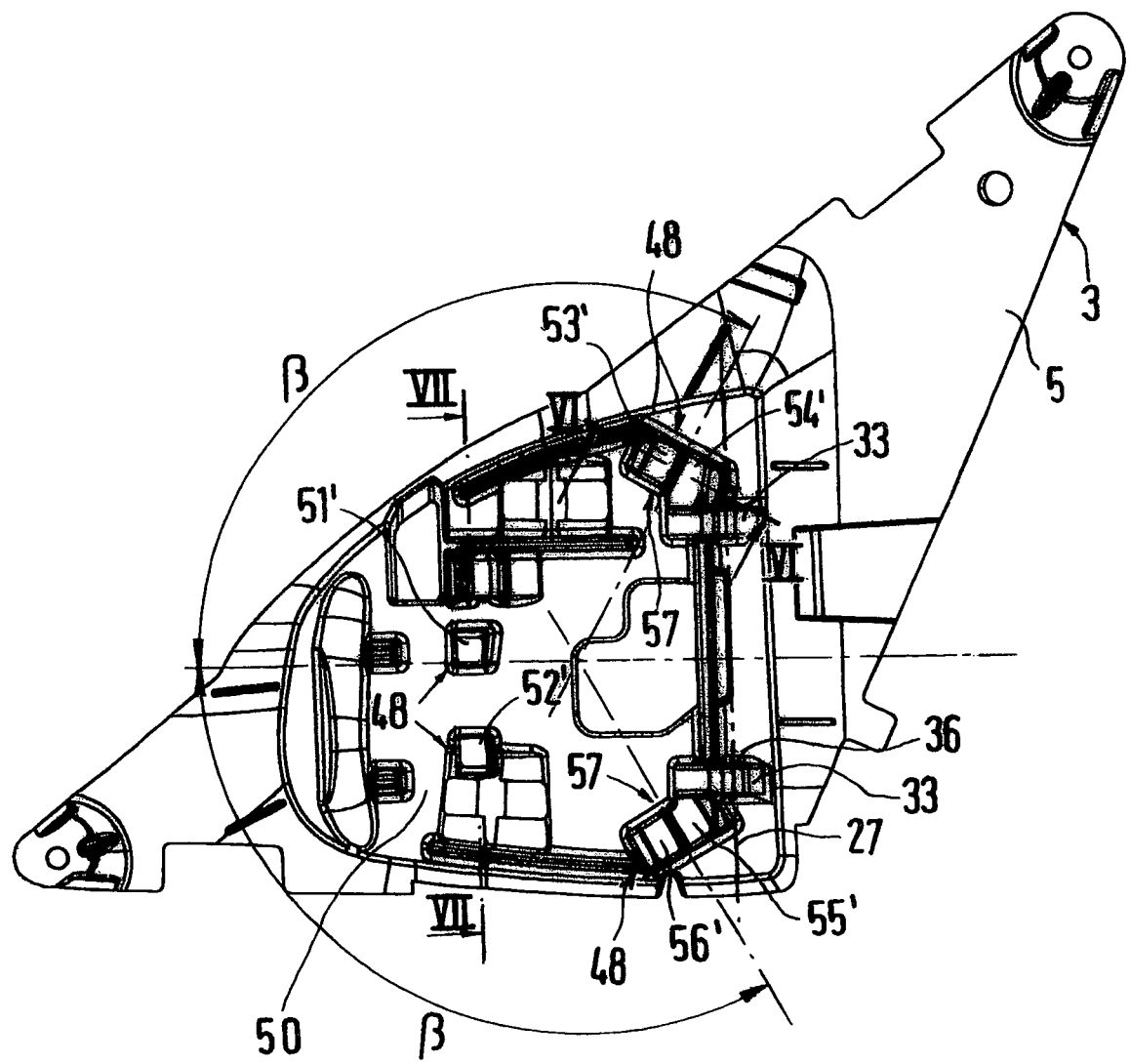
FIG. 5 is a view of the mirror base in the direction of the arrow R of FIG. 3.
Figure 6:
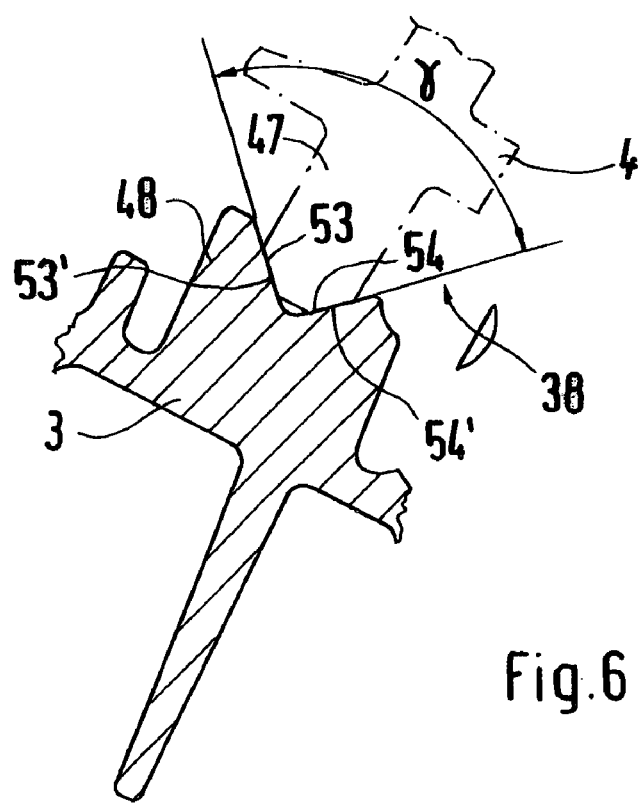
FIG. 6 is an enlarged sectional view taken along Line VI—VI of FIG. 5.
Figure 8:
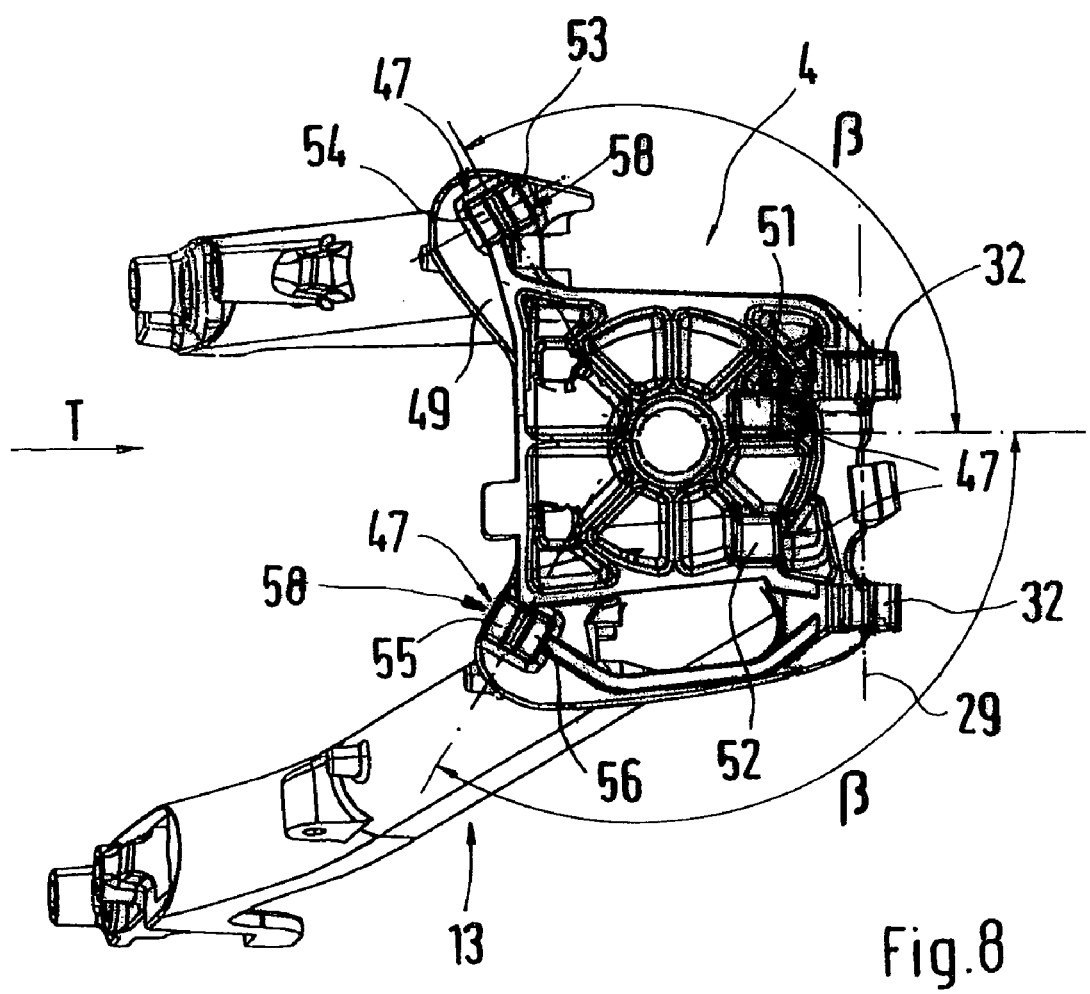
FIG. 8 is a view of the frame part of the mirror head in the direction of the arrow S of FIG. 3.
Figure 9:
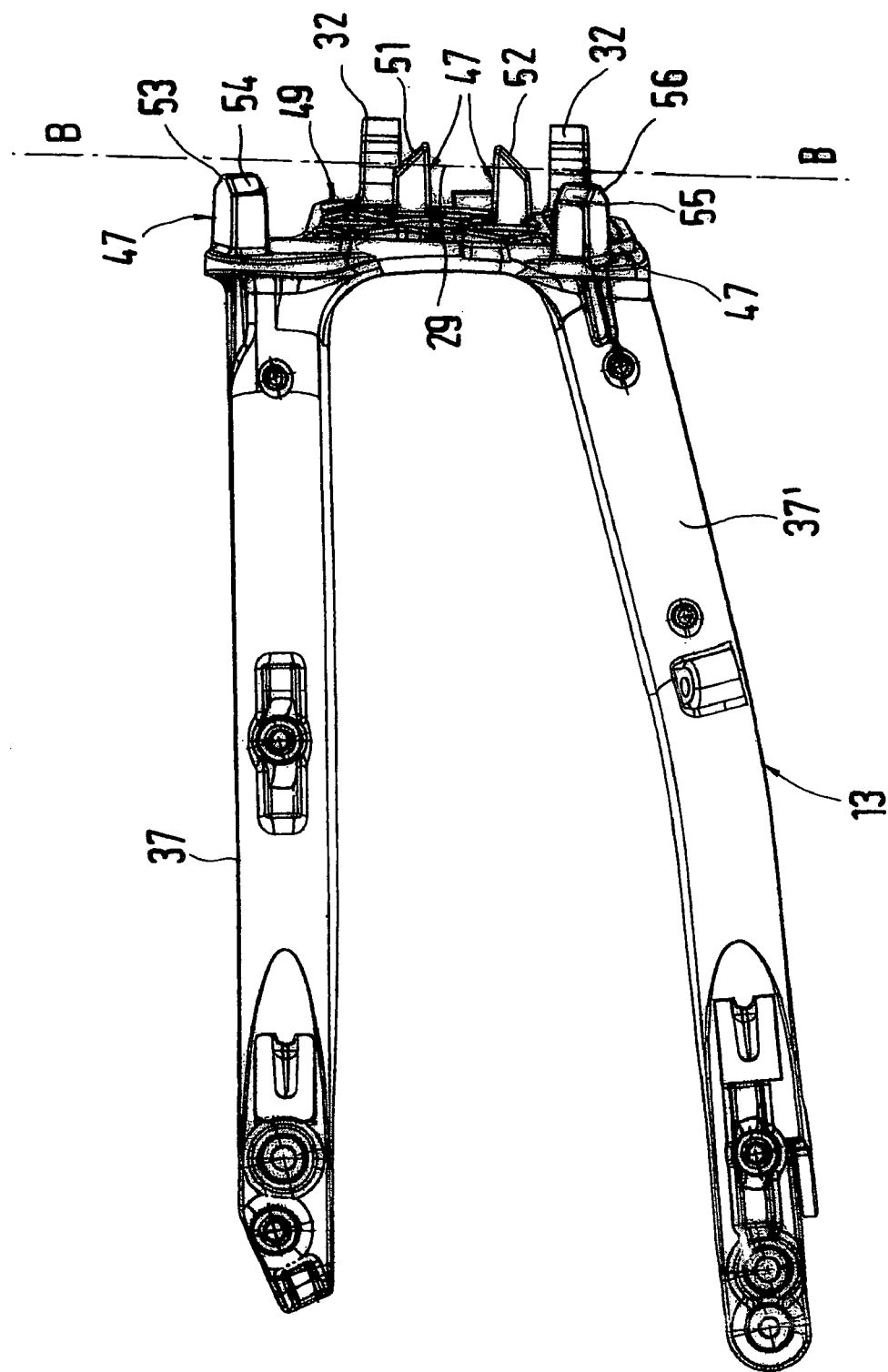
FIG. 9 is a view of the inner frame part of the mirror head in the direction of the arrow T of FIG. 8.

For forming the upright swivelling axes 27, 29, two bearing eyes 30, 31, 32, 33 spaced in the vertical direction respectively are provided at the two ends 26, 28 of the intermediate member 25 as well as at the mirror base 3 and at the mirror head 4. Hinge pins 34, 35 secured in the axial direction extend in each case through all four bearing eyes of a hinged connection which are disposed above one another. FIG. 2 illustrates the two forward bearing eyes 30 and the rearward bearing eyes 31 of the intermediate member 25. FIGS. 8 and 9 illustrate the two bearing eyes 32 of the mirror head 4 which are disposed above one another. FIG. 5 illustrates the two bearing eyes 33 of the mirror base 3. The respective passage openings on the bearing eyes 30 to 33 for the hinge pins 34, 35 each have the reference number 36.

The intermediate member 25 and the hinged connections having a relatively large play in the embodiment are used only for providing the swivelling axes 27, 29 in the event of a collision, but not for holding the mirror head 4 in a driving position A in a vibration-free position.

The vibration-free bearing of the mirror head 4 in a driving position A of the outside rear view mirror 1 is achieved in that a centering detent device 38, which is effective in at least two planes, is provided between the mirror head 4 and the mirror base 3. In the embodiment shown, the detent device 38 is effective in all three planes (X-Y-Z plane).

A force-transmitting connection between the mirror head 4 and the mirror base 3 takes place only by way of the detent device 38 according to the invention and by way of at least one spring element 39 which extends transversely with respect to the swivelling axes 27, 29 and presses the mirror head 4 with a relatively high force against the mirror base 3. In the embodiment shown, two spring elements 39 are provided which, viewed in the vertical direction, are arranged at a distance from one another. Each spring element 39 is formed by a helical tension spring 40 whose one end 41 is hung in a leg 37, 37' of the inner frame part 13. The other end 42 of each helical tension spring 40 is connected with one end 43 of a detent blade 44 which, in turn, is hung with its other end 45 in the mirror base 3. The detent blade 44 extends at an obtuse angle with respect to the helical tension spring 40 and interacts by means of a bent-away nose 46 in areas with the mirror head 4. The helical tension spring 40 can be locally provided with a covering made of rubber or plastic (not shown in detail).

The detent device 38 according to the invention comprises several spatially mutually coordinated detent elements 47 which, in the driving position A of the outside rear view mirror 1, are in a mutual engagement with corresponding detent receiving devices 48, the detent elements 47 being arranged at the mirror head 4 or at the mirror base 3, and the detent receiving devices 48 being arranged at the respective other component.

In the embodiment shown, the detent elements 47 are provided at the mirror head 4 and the detent receiving devices 48 are provided at the mirror base 3. The detent elements 47 and the detent receiving devices 48 are each constructed in one piece with the assigned component (mirror head 4, mirror base 3). According to FIGS. 8 and 9, the detent elements 47 are arranged on the frame part 13 of the mirror head 4. They specifically extend away from an upright wall section 49 of the frame part 13 and extend transversely in the direction of the mirror base 3. The upright wall section 49 of the frame part 13 extends approximately parallel to an upright auxiliary plane B—B which extends through the two upright swivelling axes 27, 29.

The detent elements 47 are oriented approximately at a right angle with respect to this auxiliary plane B—B. The mirror base 3 has an exterior upright wall section 50 which also extends approximately parallel to the auxiliary plane B—B. The detent receiving devices 48 extend away from this mirror-base-side wall section 50 in a transversely extending manner in the direction of the mirror head 4, the detent receiving devices 48 also being oriented approximately at a right angle with respect to the auxiliary plane B—B.

The detent elements 47 and the assigned detent receiving devices 48 each of a column-type construction and, at their free ends, each have slanted contact surfaces 51 to 56 and 51' to 56' respectively, in which case, in the driving position A of the outside rear view mirror 1, the adjacent contact surfaces 51, 51' to 56, 56' of one detent element 47 respectively and of the pertaining detent receiving device 58 adjoin one another in areas. The reference numbers 51 to 56 are assigned to the detent elements; the reference numbers 51' to 56' are assigned to the corresponding detent receiving devices 48.

A statically clearly defined play-free connection between the mirror head 4 and the mirror base 3 will exist when six slanted contact surfaces 51 to 56 and 51' to 56' respectively are constructed on the mirror head 4 and on the mirror base 3 in the area of the detent elements 47 and of the detent receiving devices 48 respectively. In this case, the two components 47, 48 have direct contact with one another only at these six joint bearing points. All contact surfaces 51 to 56 on the detent elements 47 and all contact surfaces 51' to 56' on the detent receiving devices 48 are in each case set at the same angle α with respect to the adjoining vertical wall sections 49, 50 of the mirror head 4 and the mirror base 3 respectively. In the embodiment shown, the angle α amounts to approximately 45°. In the top view, thus perpendicular to the auxiliary plane B—B, the individual contact surfaces 51 to 56 and 51' to 56' respectively of the detent elements 47 and of the detent receiving devices 48 are arranged at an angle β with respect to one another. Each contact surface 51 to 56 and 51 to 56' respectively can be assigned to a separate detent element 47 and a separate detent receiving device 48 respectively. In the case of this individual arrangement, which is not shown in detail, two adjacent detent elements 47 and detent receiving devices 48 respectively are in case each arranged at an angle of approximately 60° with respect to one another.

Of the six contact surfaces 51 to 56 and 51' to 56' respectively of the detent elements 47 and of the detent receiving devices 48 respectively, two contact surfaces 51, 52 and 53, 54 and 55, 56 or 51', 52' and 53', 54' and 55', 56' of the detent elements 47 and of the detent receiving devices 48 respectively form a functional unit, in which case the two assigned contact surfaces are oriented oppositely sloped and at an approximately right angle with respect to one another (angle γ). However, the contact surfaces of a functional unit of the detent elements 47 and of the detent receiving devices 48 respectively, which extend approximately at a right angle with respect to one another, may also be combined to a constructional unit 57, 58. The reference number 57 is assigned to the detent elements 47, and the reference number 58 is assigned to the detent receiving devices 48.

In the embodiment shown, detent receiving devices 48 are in each case constructed on the mirror base 3 adjacent to the upper and lower bearing eye 33, which detent receiving devices 48 have two contact surfaces 53', 54' and 55', 56' respectively which are oriented at a right angle with respect to one another. The two contact surfaces 53', 54' and 55', 56' respectively virtually form a V-shaped recessed trough at the free end of the column-type detent receiving device 48. The two detent receiving devices 48 extend diagonally to the vertical swivel axis 27 of the intermediate member 25. The column-type detent elements 47 are therefore correspondingly constructed on the mirror head 4, specifically on the frame part 13.

Figure 7:
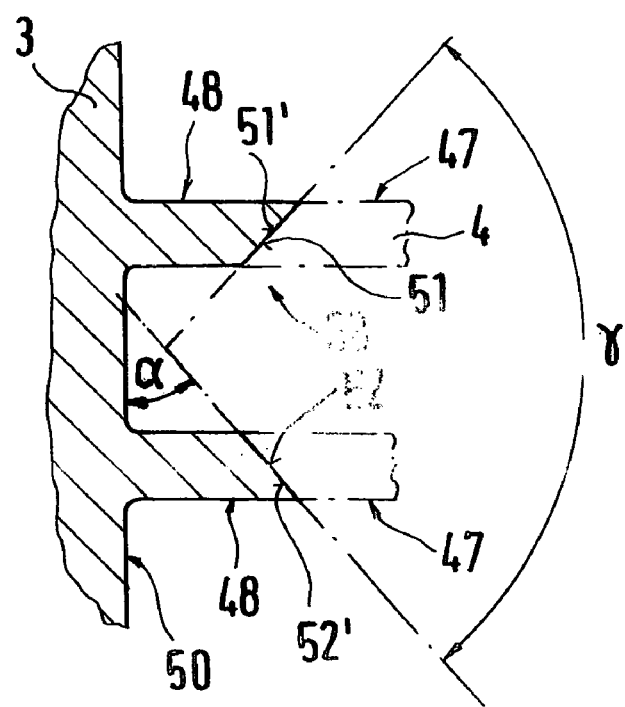
FIG. 7 is an enlarged sectional view taken along Line VII—VII of FIG. 5.

Adjacent to the swivel axis 29, two detent receiving devices 48 are arranged at a distance from one another in the vertical direction on the mirror base 3, the contact surfaces 51', 52' of both detent receiving devices 48 being oriented approximately at a right angle with respect to one another (FIG. 7). A loom of cables connected with the adjusting mechanism 16 can be guided through between the two spaced detent receiving devices 48. The corresponding detent elements 47 are constructed on the mirror head 4, one detent element 47 being arranged outside and one detent element 47 being arranged inside the frame-shaped intermediate member 25.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. Outside rear view mirror for a passenger car, comprising:
   a mirror base to be fastened to the car,
   a mirror head which can be swivelled relative to the mirror base,
   an intermediate member whose one end is connected in a hinged manner by way of a first swivel axis with the mirror base, and whose other end is connected in a hinged manner by way of a second swivel axis with the mirror head such that the mirror head can be swiveled in forward and rearward directions of the passenger car, and
   at least one spring element which extends transversely with respect to the swivel axes and which, in the driving position of the outside rear view mirror, presses the mirror head against the mirror base, wherein a self-centering detent device is provided directly between the mirror head and the mirror base exclusive of the intermediate member such that, in a driving position of the outside rear view mirror, the mirror head is connected only by way of the detent device and the at least one spring element, with the intermediate member not participating in the connection, in a force-transmitting manner with the mirror base, and the self-centering detent device having elements associated with opposite sides of the mirror head and mirror base and being so arranged as that said elements engage along a converging axis.

2. Outside rear view mirror according to claim 1, wherein the detent device comprises several spatially mutually coordinated detent elements which, in the driving position of the outside rear view mirror are in a mutual engagement with corresponding detent receiving devices, the detent elements being arranged on the mirror head or on the mirror base and the detent receiving devices being arranged on the respective other component.

3. Outside rear view mirror according to claim 2, wherein the detent elements and the assigned detent receiving devices each have slanted contact surfaces at their free mutually facing ends, and
wherein, in the driving position of the outside rear view mirror, the adjacent contact surfaces of in each case one detent element and of the pertaining detent receiving device adjoin one another.

4. Outside rear view mirror according to claim 3, wherein, in each case, six slanted contact surfaces are provided on the detent elements and the detent receiving devices and are in contact with one another in the driving position of the outside rear view mirror.

5. Outside rear view mirror according to claim 4, wherein all contact surfaces on the detent elements and are set at identical angles to the corresponding surfaces on the corresponding detent receiving elements in relation to adjoining vertical wall sections of the detent element and of the detent receiving device, respectively, and
wherein, the contact surfaces of the detent elements and the contact surfaces of the detent receiving devices, viewed perpendicular to an auxiliary plane, are arranged at an angle with respect to one another.

6. Outside rear view mirror according to claim 5, wherein, in each case, two contact surfaces of the detent elements and the detent receiving devices respectively, which form a functional unit with one another, are oriented approximately at a right angle with respect to one another.

7. Outside rear view mirror, according to claim 5, wherein each contact surface is assigned to a separate detent element or to a separate detent receiving device.

8. Outside rear view mirror according to claim 5, wherein two contact surfaces, which form a functional unit and are oriented approximately at a right angle with respect to one another, of the detent elements and of the detent receiving devices are combined to a constructional unit.

9. Outside the rear view mirror according to claim 8, wherein two adjacent ones of said constructional units extend at an angle of approximately 120° to one another.

10. Outside rear view mirror according to claim 4, wherein, in each case, two contact surfaces of the detent elements and the detent receiving devices respectively, which form a functional unit with one another, are oriented approximately at a right angle with respect to one another.

11. Outside rear view mirror according to claim 4, wherein each contact surface is assigned to a separate detent element or to a separate detent receiving device.

12. Outside rear view mirror, according to claim 4, wherein two contact surfaces, which form a functional unit and are oriented approximately at a right angle with respect to one another, of the detent elements and of the detent receiving devices are combined to a constructional unit.

13. Outside the rear view mirror according to claim 12, wherein two adjacent ones of said constructional units extend at an angle of approximately 120° to one another.

14. Outside rear view mirror according to claim 4, wherein one detent receiving device respectively which has two contact surfaces oriented at a right angle to one another is on the mirror base adjacent to upper and lower bearing eyes of swivel connections with the intermediate member.

15. Outside rear view mirror according to claim 3, wherein, in each case, two contact surfaces of the detent elements and the detent receiving devices respectively, which form a functional unit with one another, are oriented approximately at a right angle with respect to one another.

16. Outside rear view mirror according to claim 15, wherein each contact surface is assigned to a separate detent element or to a separate detent receiving device.

17. Outside rear view mirror according to claim 3, wherein each contact surface is assigned to a separate detent element or to a separate detent receiving device.

18. Outside rear view mirror according to claim 3, wherein two contact surfaces, which form a functional unit and are oriented approximately at a right angle with respect to one another, of the detent elements and of the detent receiving devices are combined to a constructional unit.

19. Outside rear view mirror according to claim 18, wherein two adjacent ones of said constructional units extend at an angle of approximately 120° to one another.

20. Outside rear view mirror according to claim 3, wherein one detent device respectively which has two contact surfaces oriented at a right angle to one another is constructed on the mirror base adjacent to upper and lower bearing eyes of swivel connections with the intermediate member.

21. Outside rear view mirror according to claim 2, wherein one detent receiving device respectively which has two contact surfaces oriented at a right angle to one another is constructed on the mirror base adjacent to upper and lower bearing eyes of swivel connections with the intermediate member.

22. Outside rear view mirror according to claim 2, wherein two detent receiving devices arranged at a distance from one another viewed in a vertical direction are constructed on the mirror base adjacent to the swivel axis, the contact surfaces of the two detent receiving devices being oriented approximately at a right angle with respect to one another.

* * * * *